United States Patent [19]

Clark

[11] 4,362,387
[45] Dec. 7, 1982

[54] METHOD AND APPARATUS FOR MEASURING VISIBILITY FROM THE POLARIZATION PROPERTIES OF THE DAYLIGHT SKY

[75] Inventor: Roy Clark, Los Angeles, Calif.

[73] Assignee: Rockwell International Corporation, El Segundo, Calif.

[21] Appl. No.: 180,536

[22] Filed: Aug. 22, 1980

[51] Int. Cl.$^3$ ............................................. G01N 21/21
[52] U.S. Cl. ..................................... 356/338; 356/364
[58] Field of Search .............. 356/336, 338, 339, 340, 356/341, 342, 364; 250/574

[56] References Cited

U.S. PATENT DOCUMENTS

| | | | |
|---|---|---|---|
| 3,177,761 | 4/1965 | Redner | 88/14 |
| 3,317,730 | 5/1967 | Hilsum | 250/83.3 |
| 3,402,631 | 9/1968 | Potter | 356/118 |
| 3,499,159 | 3/1970 | Carrier et al. | 250/217 |
| 3,572,938 | 3/1971 | Bradford | 356/116 |
| 3,603,689 | 9/1971 | Shelnutt | 356/103 |
| 3,721,500 | 3/1973 | Fugitt | 356/118 |
| 3,746,452 | 7/1973 | Teboul et al. | 356/201 |
| 3,766,380 | 10/1973 | Menzies | 250/343 |
| 3,820,897 | 6/1974 | Roess | 356/75 |
| 3,868,186 | 2/1975 | Paukert et al. | 356/207 |
| 4,034,190 | 7/1977 | White | 235/151.3 |

OTHER PUBLICATIONS

"Polarization Characteristics of an Altazimuth Sky Scanner", by L. M. Garrison, et al., *Applied Optics*, vol. 19, May, 1980, p. 1419.

"Four-Component Polarization Measurement of Lidar Atmospheric Scatterings", by J. D. Houston, et al., *Applied Optics*, vol. 17, Feb. 15, 1978, p. 614.

"Degree and Direction of Polarization of Multiple Scattered Light (1.) Homogeneous Cloud Layers and (2.) Earth's Atmosphere with Aerosols", by G. W. Kattawar, et al., *Applied Optics*, vol. 11, Dec., 1972, pp. 2851-2878.

Welhelmi et al., "Remote Water Quality Measurements with a LIDAR Polarimeter", *Proc. Soc. Photo-Optical Instruc.*, 16th ann. Tech. meet, vol. 4, pp. 131-137, Oct. 1972.

*Primary Examiner*—John K. Corbin
*Assistant Examiner*—Matthew W. Koren
*Attorney, Agent, or Firm*—Clark E. DeLarvin; Henry Kolin; H. Fredrick Hamann

[57] ABSTRACT

A method and an optical sensing apparatus (1) are disclosed for measuring the polarization properties of light being scattered in the sky to obtain an accurate indication of visibility. The intensities ($I_1$ and $I_2$) of two linearly polarized components of the daylight are measured, so that a polarization ratio (P) can be calculated to provide a visibility index by which visual quality and visual range can be determined. The present method and apparatus may be extended to determine plume blight by comparing the polarization properties of light scattered by the plume with the polarization properties of the background sky, whereby theoretical visibility models may be validated. In an alternate embodiment, another apparatus (30) may be utilized with a sensing system (46) that employs polarization modulation techniques, so that the polarization properties of the entire sky can be measured in the ultraviolet and infrared regions of the electromagnetic spectrum. Accordingly, indications of both gas phase and particulate pollutant distributions in the atmosphere can be simultaneously determined depending upon the magnitude of the polarization ratio (P) in regions of atmospheric pollutant absorption.

22 Claims, 13 Drawing Figures

METHOD AND APPARATUS FOR MEASURING VISIBILITY FROM THE POLARIZATION PROPERTIES OF THE DAYLIGHT SKY

TECHNICAL FIELD

This invention relates to an optical measuring apparatus and to a method in which the polarization properties of daylight being scattered in the atmosphere are utilized to determine both visual quality and visual range. Moreover, the aforementioned method may also be applied to study plume blight and long range pollution transport. The present invention may be practiced in the visible region of the spectrum as well as in the ultraviolet and infrared regions of the spectrum.

BACKGROUND ART

Reliable visibility measurement has recently become of particular concern because of the increasing impact that low visibility occurrences have on a contemporary society. By way of example, visibility is an important consideration to airlines and environmentalists. More particularly, much of the emphasis of visibility measurement in the air transportation industry relates to safety and to the identification and measurement of adverse visibility situations within relatively short distances (i.e. in a visual range of approximately 10 km) from an airport. By way of another example, environmentalists are concerned, because increasing levels of man-made air pollution are having an adverse impact on urban areas as well as vegetation and wildlife in scenic areas throughout the United States.

In an effort to abate the adverse effects created by increasing pollution levels, the United States Congress legislated the Clean Air Act and subsequent Amendments. One purpose of the aforementioned legislation was to both remedy existing degradation and prevent future impairments of visibility in certain prescribed federal areas which were unusually susceptible to the adverse effects of man-made air pollution. Accordingly, certain restrictions were placed on major stationary sources of air pollution, so as to prevent the cumulative emission of pollutants from adversely impacting the visibility of the prescribed areas. By way of example, these aforementioned areas include national parks and wilderness sites in the Western United States.

The Clean Air Act also contemplated the protection of visibility in "integral vistas to the areas specifically prescribed in the Act". That is, visibility protection has also been extended to areas surrounding the national parks and wilderness areas, so as to ensure visitor enjoyment thereof. In order to remedy existing visibility impairment, Congress also introduced the concept of Best Available Retrofit Technology (BART). Hence, a major source of pollution that was found to have an unacceptable impact on visibility was required to clean up its emissions by using the BART techniques. However, as a consequence of the relatively stringent regulations and controls that have beem embodied in the Clean Air Act, a large financial burden has been placed on the major sources of emission. As a result, there has been considerable impetus for the development of visibility measurement instrumentation and visibility modeling techniques, whereby pollution sources could be reliably monitored and the pollution abatement regulations consistently enforced.

One potential problem that may result during compliance with the Clean Air Act relates to the changes in emissions that occur when various emission controls are installed at the source. More particularly, most of the particulate matter and sulfur dioxide are suitably removed by currently available emission control equipment. However, much of the nitrogen oxides produced by high temperature combustion continue to be emitted into the atmosphere, whereat said oxides are converted in part to nitrogen dioxide. Such nitrogen dioxide is gaseous matter that absorbs light in the visible part of the electromagnetic spectrum. Such absorption can undesirably lead to visibility degradation. Therefore, a problem that has heretofore been unresolved in the application of conventional pollution detection methods is to be able to distinguish between particulate scattering and nitorgen dioxide absorption, both of which can cause a reddish brown haze under certain observation conditions. Unfortunately, there are no readily available remote monitoring apparatus in which particulate scattering and nitrogen dioxide absorption can be easily and reliably distinguished.

In general terms, visibility is typically related to the measurement of visual range (i.e. the greatest distance that a person can see), and several devices are known for indicating range. However, degradation of visual range correspondingly causes changes in the coloration of distant targets. Generally, there are three conventional instruments and respective methods currently being utilized in order to obtain an indication of visibility.

One such conventional instrument for obtaining a measurement of visibility is that known as the transmissometer. In general terms, transmissometry is the direct measurement of the attenuation of a light beam by the atmosphere. The transmissometer typically includes a source for generating a beam of light (which may or may not be monochromatic). By way of example, the light beam may be generated from a laser source. A detector is provided to measure the attenuation of the light beam. If the initial intensity of the light is known, the attenuation thereof can be related to the visual range.

The main disadvantage to transmissometry is that the reliability thereof is generally limited to short sight paths. That is, the maximum sensitivity of the transmissometer is typically limited to the observation of atmospheric attenuation over the range of a few kilometers. Another fundamental problem typically encountered in transmissometry is that the measured transmission characteristics of the atmosphere over a relatively short distance do not necessarily represent the transmission characteristics of the atmosphere over a much longer visual range. This result is due in part to atmospheric inhomogeneities along the full visual range of the sight path and because other optical effects, such as multiple scattering, usually manifest themselves over only very long optical paths. Hence, the conventional transmissometer is relatively insensitive to multiple scattering effects, so that a measurement of long visual range is difficult and unreliable. Moreover, as will be known to those skilled in the art, the conventional transmissometer is characteristically susceptible to optical alignment purturbations.

A second conventional instrument for measuring visibility is that known as the nephelometer. In general terms, nephelometry is the measurement of light scattering properties of a small volume of air, which volume is assumed to be a representative sample of the atmosphere, as a whole. Hence, a nephelometer is essentially a point source measuring device. However, and as will be recognized by those skilled in the art, utilizing a nephelometer to obtain an indication of air quality may provide inherently inaccurate measurement results, inasmuch as the localized measurement of a small volume of air is, in reality, not necessarily representative of the atmosphere, as a whole. One well-known type of nephelometer is that known as an integrating nephelometer. The integrating nephelometer typically includes a light source and a detector that are arranged relative to one another, so that the light source illuminates a small volume of air. The light scattered by the air is measured by the detector. Optical filters may be installed to simulate the response of the human eye. However, the nephelometer may not be sufficiently sensitive to multiple light scattering in all observation angles. Since long visual ranges are typically associated with low scattered light levels, the measurement of visual range that is obtained with the conventional nephelometer may be replete with uncertainity.

A third conventional instrument for indicating visibility is that known as a telephotometer. In general terms, telephotometry is the measurement of the difference in contrast between the brightness of a distant target and the brightness of the horizon sky just above the target. In obtaining telephotometric measurements of range, the target is usually assumed to be black. The target brightness is typically caused by atmospheric light scattering between the target and the observer. If the distance to the target is known, the visual range can be calculated from the measured contrast ratio. A telephotometer generally includes a telescope fitted with a detector, so as to be capable of measuring the intensity of incident light signals. The telephotometer also includes an arrangement of optical filters in order to determine the wavelength of the light received by the detector. Conventional telephotometers may also use a beam shifter so as to efficiently refocus an incident light beam.

In operation, the respective intensities of the light received from the target and the horizon sky above the target are measured and a contrast ratio is then calculated by making a black target approximation. In practice, however, most targets are not black, and, as a consequence of the black target approximation technique utilized by the conventional telephotometer, the measurements obtained thereby may contain inherent errors regarding target brightness.

In view of the foregoing, those skilled in the art will appreciate that the currently known apparatus and methods for making visibility measurements are limited to observations close to the ground. As has already been pointed out above, nephelometry is a point source measurement, and transmissometry is typically limited to relatively short sight path lengths, so that atmospheric inhomogeneities and multiple scattering effects are not measured. What is more, telephotometry requires the observation of a distant target. Moreover, during typical measurement techniques, telephotometry relies upon the conversion of a contrast ratio into a visual range based upon a black target approximation. Such a black target approximation can introduce errors of unknown magnitude. What is more, none of the conventional measurement instruments described above is capable of distinguishing between light scattering and light absorption. More particularly, a transmissometer and a telephotometer measure both scattering and absorption simultaneously. In its conventional application, the nephelometer measures only light scattering. What is even more, conventional visibility measuring apparatus are adapted to provide a limited indication of visual range. However, none of the conventional visibility measuring apparatus is also capable of concurrently providing an accurate indication of visual quality.

By way of one example, a document which relates the effects of light scattering in the atmosphere to visibility is that entitled "Scattered Radiation in the Atmosphere and the Natural Aerosol", by K. F. Bullrich, *Advances in Geophysics*, Volume 10, page 99 (1964). However, neither this document nor any other known document discloses a method or apparatus for measuring the polarization characteristics of the daylight sky to provide an accurate indication of the visual quality and visual range.

SUMMARY OF THE INVENTION

Briefly, and in general terms, a unique method and optical apparatus for accurately measuring visibility are disclosed. The present method relies upon the linear polarization of the daylight sky and the basic physics of atmospheric light scattering to provide a convenient index that is indicative of both visual quality and visual range. The present method includes the steps of calculating a polarization ratio by measuring the intensities of two linearly polarized components of the daylight, which components are aligned perpendicular to one another. The wavelength dependence of the polarization ratio can be utilized to provide a determination of visibility in either urban or pristine areas when both Rayleigh and particulate scattering are present in the atmosphere. The aforementioned intensities are preferably measured by aligning the optical measuring apparatus to make an angle of 90° relative to a vertical plane formed between the sun and the point of observation. A determination of visual quality and visual range is obtained by examining the daylight sky at approximately 5° above the horizon. However, the optical measuring apparatus can also be aimed so that any point in the sky can also be studied, whereby the present method can be extended to study plume blight. An indication of the degradation of visibility as a consequence of a plume is provided by establishing a contrast ratio to compare the polarization properties of the daylight scattered by a plume with the polarization properties of light scattered by the (generally clearer) background sky.

The measuring apparatus of the present invention comprises the combination of a rotatable linear polarizer and a conventional multi-wavelength telephotometer. Unlike conventional telephotometry techniques, a target is not required when making visibility measurements with the instant modified telephotometer and according to the preferred method, as described above. The elimination of a target advantageously facilitates the study of plumes over the entire sky, as well as an investigation of visibility situations in relatively flat areas where a target is not readily discernible. The modified telephotometer measures the intensities of the aforementioned two linearly polarized components of the daylights over a range of wavelengths generally corresponding to a portion of the visible spectrum from blue to red. The wavelength dependence of the calculated polarization ratio is especially useful for distinguishing light absorption from light scattering.

ADVANTAGES OF THE PRESENT INVENTION

A unique method for measuring visual quality and visual range that forms the present invention utilizes the polarization properties of light scattered within the atmosphere. Therefore, visibility measurements obtained according to the present teachings, are not limited to near horizon observation, which is a common limitation of conventional telephotometry. Hence, by virtue of the present method, plumes and long range pollution transport can be suitably investigated. As will be disclosed in greater detail hereinafter, the present measurement techniques do not require targets. Accordingly, uncertainties that are inherent in conventional visibility measurement techniques in which targets are required are eliminated. Moreover, unlike conventional visibility measurement methods, the present method is advantageously sensitive to the effects of multiple scattering in the atmosphere.

The present method for measuring visibility provides a simple but accurate indication of visual quality. What is more, long term trends in visual quality can be accurately measured by practicing the method to be hereinbelow disclosed.

In addition to the advantage of providing an accurate indication of visual quality, the present method can also be used to measure visual range. Moreover, by virtue of practicing the present method, measurements indicative of the visual quality and visual range can be collected simultaneously without the requirement of any target. This is particularly advantageous in flat areas where few suitable targets are available.

A further advantage of the present invention is that the method for measuring visibility that is to be described below can also be suitably applied for the study of plume blight. Inasmuch as the present method is not limited to near horizon investigations, the entire sky can be studied, whereby the visibility of a plume can also be examined.

A still further advantage of the present invention is to provide a reliable technique by which to distinguish between gas phase absorption of light and aerosol scattering in the atmosphere. By having the ability for accurately making the aforementioned distinction, environmental engineers may be better able to determine the true origin of large concentrations of pollution within the atmosphere. What is still more, such a technique, enables potentially large polluters to easily and economically monitor themselves and thereby comply with anti-pollution legislation, such as the Clean Air Act, and the like. What is even more, the present technique may be applied to the development of models and guidelines which would permit pollution controls to be stringently, but consistently, enforced in all areas of the country.

Yet an additional advantage of the present invention is to provide an easily implemented apparatus for reliably making visibility measurements, whereby accurate indications of visual quality, visual range, and plume blight may be obtained.

Still another advantage of the present invention is to provide an optical measuring apparatus that can provide a means for measuring visibility in the ultraviolet and infrared regions of the spectrum in order to examine both gaseous and particulate pollution distribution in the atmosphere.

DESCRIPTION OF THE PREFERRED EMBODIMENT

In general terms, visibility may be defined as the study of the transition in the atmosphere from Rayleigh to aerosol light scattering. An increase in the overall scattering cross-section in the atmosphere leads to the degradation of visual range. Moreover, the change in the wavelength dependence of the scattered light gives rise to degradation of visual quality. Both visual quality and visual range are closely related to the same light scattering transitions. In accordance with the teachings of the present invention, and unlike that which is known in the art of visibility measurement, it has been discovered that the polarization properties of scattered daylight in the atmosphere can provide reliable parameters for measuring both the visual quality and visual range. Inasmuch as visibility is dependent upon the transition from Rayleigh scattering to aerosol scattering, a brief description of the nature of each of these light scattering effects is provided below. It is to be noted, however, that the cumulative effects of multiple scattering in the atmosphere (i.e. the light scattered by a large number of aerosol particles) also affects, to a degree, the polarization of daylight.

Rayleigh scattering is the scattering of light by air molecules. Under very clear visibility conditions, Rayleigh scattering is responsible for the blue appearance of the sky and the polarization thereof. The degree of Rayleigh scattering in the atmosphere is inversely proportional to the fourth power of the particular wavelength of light. Accordingly, light of shorter wavelength (in the blue region of the spectrum) is scattered much more strongly than light having longer wavelengths (in the red portion of the spectrum), so that under ideal visibility conditions, the daylight sky appears blue.

Aerosol scattering is generally caused by smog or plume particles in the atmosphere. The degree of aerosol scattering is inversely proportional to approximately the first power of the particular wavelength of light, so that the wavelength dependence of aerosol scattering is less than that of Rayleigh scattering. As the amount of aerosol content in the atmosphere increases, the air turns characteristically gray (because the intensity of red light in aerosol scattering increases relative to the intensity of blue light).

According to a first preferred embodiment of the present invention, a unique method is disclosed by which the polarization properties of the daylight sky are utilized to determine both visual quality and visual range. Those skilled in the art will realize that there are many methods of measurement which include a step of examining the characteristics of linearly polarized daylight. However, no methods are known in which polarization characteristics of sunlight scattered in the atmosphere are measured for the particular purpose of determining both visual quality and visual range, as is accomplished by the instant method.

Figure 1:
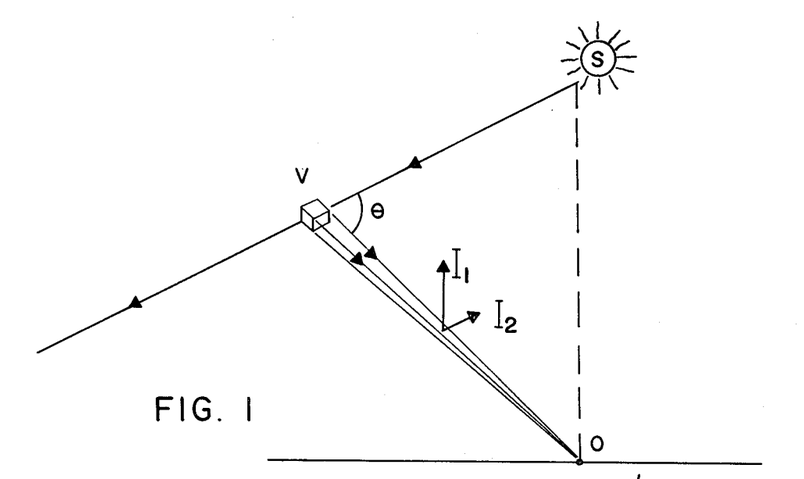
FIG. 1 illustrates the orientation of two linearly polarized components of the daylight sky, the relative intensities of which providing a measure of visual quality and visual range in the atmosphere.

In order to obtain an indication of both visual quality and visual range, the intensities of two linearly polarized components of the daylight sky are measured. A unique apparatus for measuring the intensities of the two polarized components of the daylight will be described hereinafter, when referring to FIG. 5. More particularly, and referring to FIG. 1 of the drawings, the two aforementioned polarized components of the daylight, which have intensities designated $I_1$ and $I_2$, are respectively aligned perpendicular and parallel to a plane containing a point of observation, O, the sun, S, and an arbitrary volume, V, of air located in the atmosphere. Volume V is irradiated under different visibility conditions by light which originates at the sun. Daylight which becomes scattered in volume V, at a scattering angle, designated $\theta$, is linearly polarized to various degrees by the scattering effects in the atmosphere. Hence, the plane from which the intensities of the two linearly polarized light components are investigated may be geometrically described as OVS.

A polarization ratio, designated P, relative to the two measured linearly polarized light intensities is defined according to the following relationship:

$$P = \frac{I_1 - I_2}{I_1 + I_2}.$$

A determination of the polarization ratio provides a simple and accurate indication of visual quality, inasmuch as this ratio is indicative of the type of light scattering in the atmosphere as well as the number and nature of the aerosol particles which have a tendency to limit the quality of visibility. In the absence of any aerosol particles in the atmosphere, the scattered sunlight is most highly polarized when scattered at a scattering angle $\theta$ of 90°. Such a scattering effect is characteristic of Rayleigh light scattering. More particularly, when the daylight is scattered at an angle $\theta$ of 90°, the scattered light is fully linearly polarized in a direction perpendicular to the plane OVS. Therefore, the corresponding intensity $I_1$ is maximized, while the intensity $I_2$ of the polarized light component parallel to the plane OVS is minimized, so that the polarization ratio P reaches a maximum (i.e. nearly 1.0). Sunlight that is scattered by aerosol scattering and multiple scattering effects at an angle $\theta$ of 90° will be less polarized than sunlight scattered by the effects of Rayleigh scattering at a scattering angle of 90°. Therefore, the polarization ratio will decrease from its maximum when the effects of aerosol and multiple light scattering are introduced.

Figure 2:
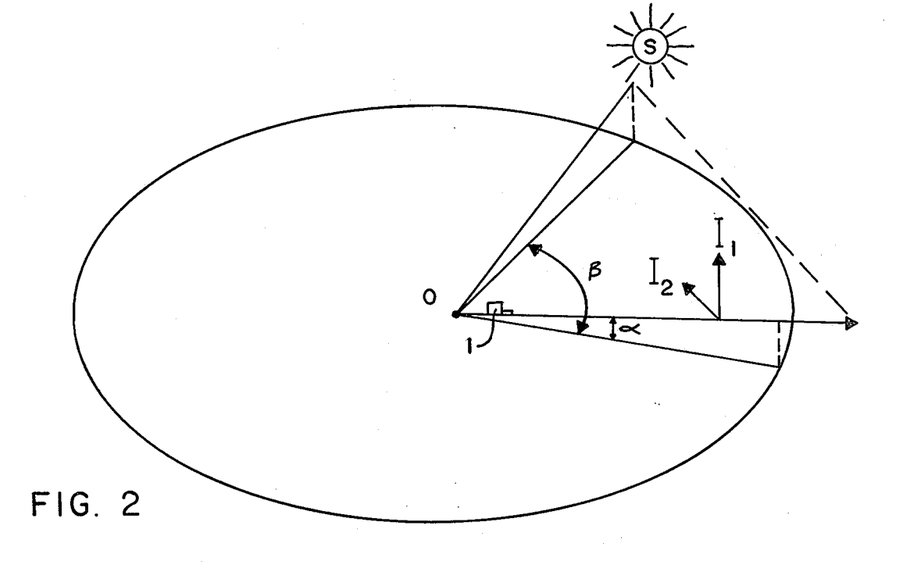
FIG. 2 represents the preferred alignment of an optical measuring apparatus relative to the sun and the horizon for making measurements of visual quality and visual range.

To be suitably responsive to the effects of aerosol light scattering which increase near the horizon, the intensities $I_1$ and $I_2$ of the polarized light components are preferably measured relatively close to the horizon (i.e. at an angle of elevation $\alpha$ of 5° thereabove). Moreover, since the region of sky in which maximum polarization occurs is approximately 90° from the sun, the intensities $I_1$ and $I_2$ are measured at an angle of observation $\beta$ of 90° from a vertical plane formed between the sun S and the point of observation O. FIG. 2 of the drawings illustrates the angle of elevation $\alpha$ above the horizon and the angle of observation $\beta$ relative to the sun for orienting an optical measuring apparatus 1 in order to determine visual quality and visual range according to the method of the first embodiment. As the sun appears to move across the sky and different polarization measurements are obtained, the position of the measuring apparatus 1 is changed around the horizon, while maintaining the angles $\alpha$ and $\beta$ from the point of observation.

The polarization ratio can be used to form a visual quality index when P is expressed as a percentage. The index has values from 0% to 100%. A large polarization index implies few concentrations of aerosol particles, and, accordingly, a better visual quality. Since light scattered by Rayleigh scattering is highly polarized, a large polarization index also implies a relatively long visual range.

Figure 3:
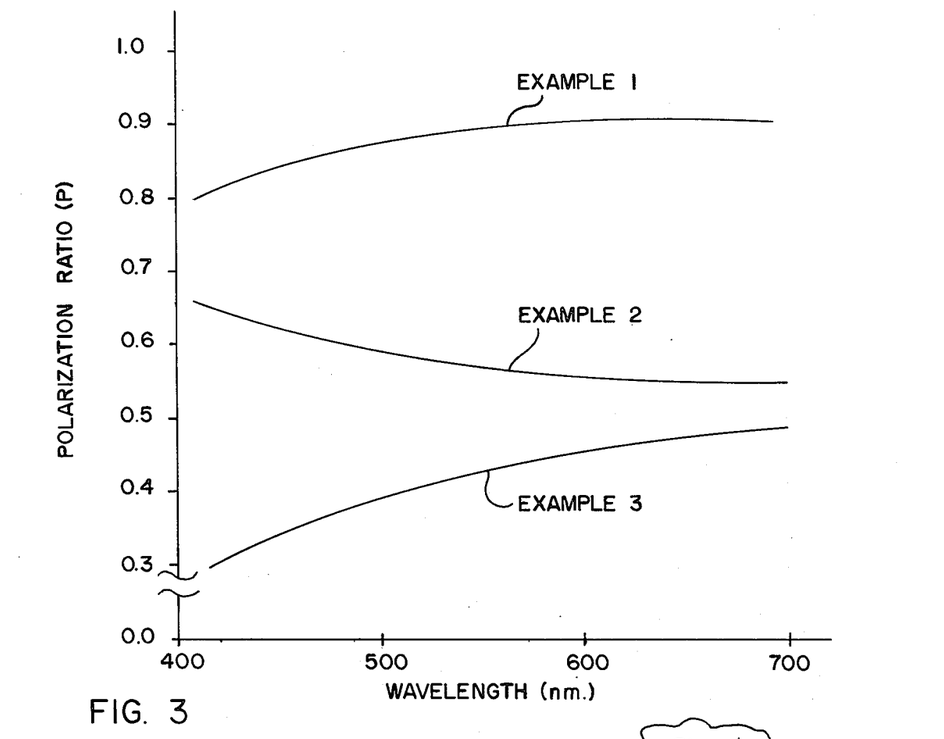
FIG. 3 is illustrative of the variation in magnitude and wavelength of the polarization ratio P in good, intermediate, and poor visibility conditions.

Referring to FIG. 3 of the drawings, three examples are provided to illustrate different measurements of visual quality under different visibility conditions relative to the variation in magnitude and the wavelength dependence of the polarization ratio P. The respective polarization ratios are calculated over that portion of the spectrum to which the human eye is sensitive (e.g. at wavelengths of approximately 400-750 nm, which correspond to a range of colors in the spectrum from blue to red).

EXAMPLE 1

By way of a first example, it has been found that when light scattering in the atmosphere is close to Rayleigh or molecular scattering, the visual range is relatively long (generally in excess of 50 km), and the polarization ratio is correspondingly high. Such characteristics are indicative of relatively good visual quality. A polarization ratio of 0.7 to 1.0 (i.e. 70% to 100%) represents a condition of good visual quality. However, it has been found that the polarization ratio decreases as the wavelength of the detected light is decreased from the red to the blue portion of the visible spectrum.

EXAMPLE 2

By way of a second example, it has been found that under atmospheric conditions of intermediate visual quality (i.e. less quality than that characterized by the polarization ratios of Example 1), the light scattering is mixed. That is, the light scattering in the atmosphere under conditions of intermediate quality typically consists of a combination of Rayleigh and aerosol scattering. Moreover, it has been found that the visual range is decreased (from that of Example 1) to between 20 to 50 km. The polarization ratios correspondingly decrease to a level lying in a range of approximately 0.5 to 0.7 (i.e. 50% to 70%). What is more, wavelength dependence of the polarization ratio measured in an atmosphere of intermediate quality is generally contrary to that expected in an atmosphere of good visible quality. That is, the polarization ratio increases with decreasing wavelength from the red to the blue portion of the visible spectrum, so that the polarization ratio in the blue is now larger than that in the red. In general, the polarization ratio would typically decrease with decreasing wavelength, but the difference in the wave-length dependence between Rayleigh and aerosol scattering (as was earlier discussed) is the cause of this variance.

EXAMPLE 3

By way of a third example, visibility may be reduced to a lesser quality than that represented by the atmospheric conditions in either of Examples 1 or 2. A situation of poor visibility generally occurs when the light scattering is almost entirely due to aerosol scattering. More particularly, it has been found that in a poor visual quality situation, the visual range is substantially reduced, typically below 20 km. Moreover, the polarization ratios correspondingly decrease, generally below 0.5 (i.e. 50%). Consistent with the wavelength dependence of the polarization ratio under conditions of good visibility, in situations of poor visibility, the polarization ratios decrease with decreasing wavelength from the red to the blue portion of the visible spectrum. It is to be understood, however, that the precise distance of visual range and the values of the polarization ratios used for illustrating the situations of poor and intermediate visual qualities may vary slightly, depending upon the nature of the aerosol. Thus, it can be seen that the polarization ratios detected in atmosphere with high aerosol concentration are typically less than that in which primarily Rayleigh scattering occurs.

To the present, visual range was usually defined as the longest distance that could be seen by the human eye. Such a concept produces indefinite measurements. A determination of the polarization ratio close to the horizon and at 90° to the sun, as previously disclosed, can provide an accurate indication of visual range, inasmuch as a decreasing polarization ratio manifests itself as a decreasing visual range, as was illustrated in the examples, above. The precise relationship between the polarization ratio and visual range is partially dependent upon the nature of the aerosol in the atmosphere. However, because of the effects of multiple scattering, the polarization ratio is more sensitive to the number of scattering particles than to their precise nature. Provided that the aerosol size distribution does not change significantly as the number of aerosol particles increase, a determination can be made as to the dependence of the polarization ratio on visual range, so that a precise measurement of visual range and visual quality may be made simultaneously and without the necessity of utilizing a target (as is otherwise required in conventional visibility measuring techniques). The dependence between the polarization ratio and visual range will typically be a smoothly varying relationship.

It is to be noted that the measurement of the polarization characteristics of the daylight sky need not be limited to observations close to the horizon and at 90° to the sun, as was best illustrated in FIG. 2. The two light intensities $I_1$ and $I_2$ (best depicted when referring to FIG. 1) can be measured throughout the entire sky and still provide suitable information concerning visibility degradation. A particularly useful application of the polarization ratio at any point in the sky is for the measurement of plume blight. Observation of the changes in the polarization ratio as a result of a plume covering a portion of the sky can provide a direct measurement of the visual impact of the plume. It has been found that the presence of the plume causes a change in the measured intensities of $I_1$ and $I_2$ (relative to those in clean sky) and a significant change to the polarization ratio.

Changes in the polarization ratio can be related to light absorption, as opposed to light scattering. More particularly, $NO_2$ absorption in the atmosphere changes only the light intensity, whereas particulate scattering changes both the intensity and the polarization ratio. These characteristics can be extremely useful (such as to government agencies) for distinguishing between gas phase absorption of light and the aerosol scattering of light. The ability to easily and reliably make this distinction has heretofor been generally unavailable.

Figure 4:
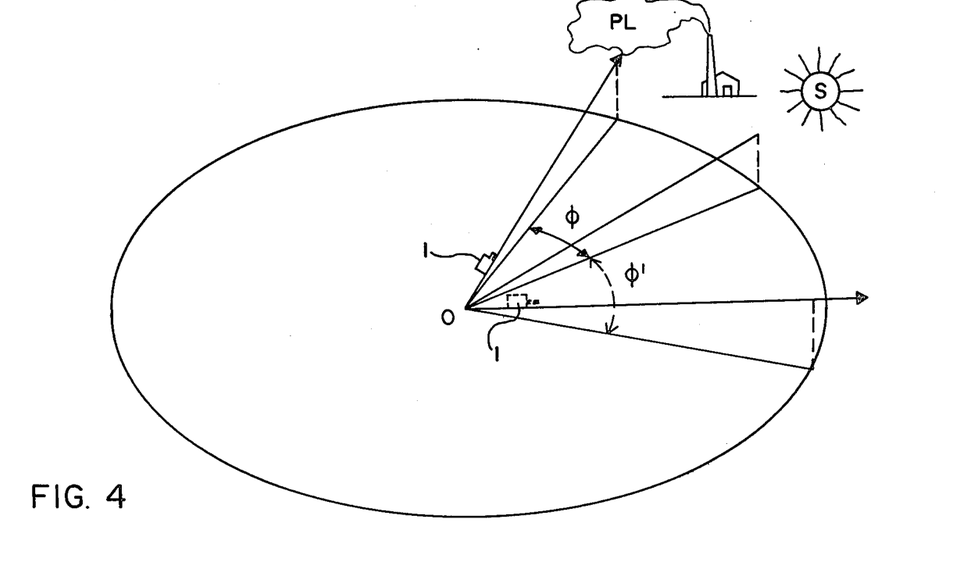
FIG. 4 represents the preferred alignment of an optical measuring apparatus relative to the sun to measure the effect of a plume on the background sky.

Referring to FIG. 4 of the drawings, for a plume PL dispersing in one region of the sky, it is desirable that the direction of observation can be arranged, such that angles (designated $\phi$ and $\phi'$), which are mirror images of each other, are formed on both sides of a sun-observer vertical plane. In this way, the plume PL can be observed by an optical measuring apparatus 1 on one side of the vertical plane and then compared by said apparatus (shown dotted) to relatively clean sky on the other side of the plane. More particularly, the polarization properties of the light scattered by the plume are compared with the polarization of the background sky. This comparison can provide a contrast ratio, designated $C_{PL}$, for the plume, whereby to measure the adverse effects of the plume on the atmosphere.

The contrast ratio $C_{PL}$ is determined by measuring the respective intensities of two linearly polarized components of light from each of a sector of the sky in which the plume is dispersing and from the clear sky at the same angle as the plume, but at the opposite side of the sun-observer vertical plane. The total intensity $I_{pt}$ of the light scattered by the plume is the sum of the intensities $I_{p1}+I_{p2}$ of the perpendicularly aligned, polarized light components scattered by the plume. The total intensity $I_{st}$ of the light scattered by the relatively clean sky is the sum of the intensities $I_{s1}+I_{s2}$ of the perpendicularly aligned, polarized light components scattered by the sky on the other side of the vertical plane. Accordingly, the contrast ratio may be defined by the following relationship:

$$C_{PL} = \frac{I_{pt} - I_{st}}{I_{st}}.$$

The contrast ratio, as described above, will be negative if the plume is darker than the background sky and positive if the plume is brighter than the background sky. The polarity of the contrast ratio thus provides a useful indication of plume blight. Moreover, by virtue of the presently disclosed method of examining plume blight by indentifying the polarization components of the plume and the background sky, a theoretical model devised for predicting plume blight can be adequately tested and validated.

In accordance with a second preferred embodiment of the invention, an optical measuring apparatus that is used to determined the polarization ratio, so that visual quality and visual range may be accurately measured, as described above, is shown in FIG. 5 of the drawings. The apparatus utilizes a plurality of well-known optical elements interconnected with one another in a unique relationship. By way of particular example, a conventional multi-wavelength telephotometer 1 can modified according to the second embodiment of the present invention to make the appropriate polarization measurements (of $I_1$ and $I_2$ of FIG. 1). The modified telephotometer includes a cylindrical telescope 2 having located therein an objective lens 3 for collecting light. A filtering system 4, such as a well-known filter wheel is positioned to receive incident light which is collected by lens 3. The filter wheel 4 is rotated, so that different filters can be selectively aligned to receive incident light signals from lens 3. A detector, such as a conventional PIN diode 6, is positioned to measure the intensity of the light signals that are transmitted through filter wheel 4 at different wavelengths. The detector 6 is interfaced with conventional telephotometer (e.g. optical-to-electrical) electronics 7. The telephotometer 1 may be combined with a suitable mount for tracking the sun across the sky.

Figure 5:
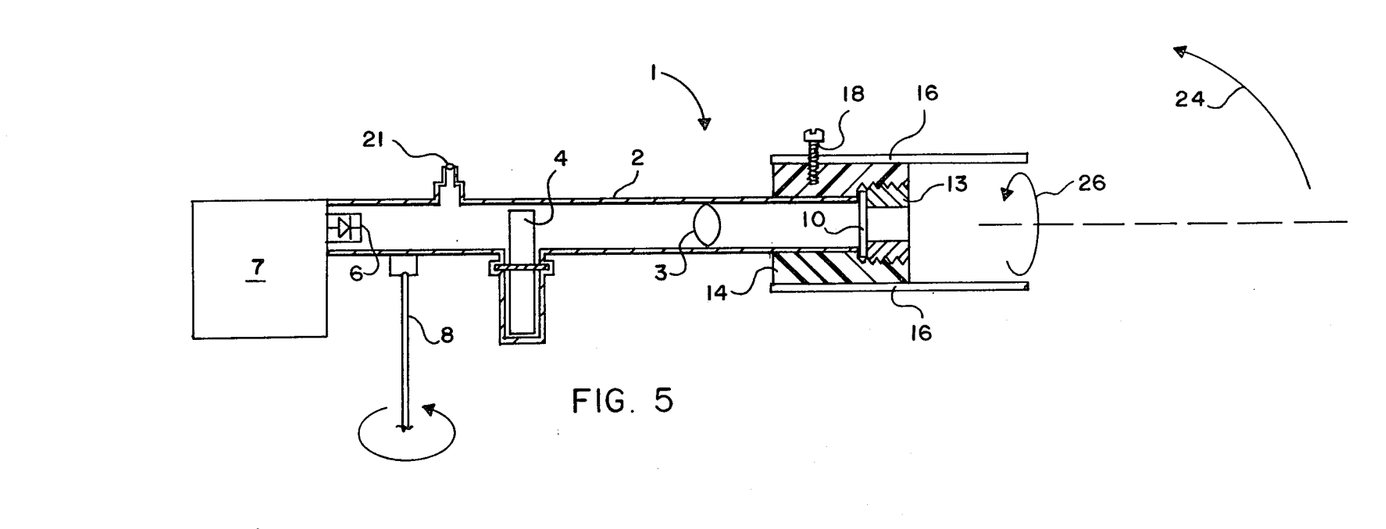
FIG. 5 is a schematic of an optical measuring apparatus for measuring the intensities of the linearly polarized components of the daylight sky that are depicted in FIG. 1.

The telephotometer 1 is modified to provide measurements that are indicative of both visual quality and visual range by connecting a linear polarizer 10 at the light receiving end thereof. A holder 12 for the polarizer 10 includes a ring 13 that mounts polarizer 10 on a rotatable collar 14 in front of the objective lens 3, so that polarizer 10 is aligned across the receiving end of the telescope 2. Polarizer 10 can be rotated in front of lens 3 by means of collar 14, whereby to become selectively responsive to the polarized components of the daylight under investigation. A conventional light shield 16 surrounds collar 14 and encloses polarizer 10, so as to block the effects of stray light signals. Accordingly, incident light signals that are supplied to the receiving end of the telescope from the atmosphere are transmitted through polarizer 10 to the lens 3.

By way of particular example, the polarization measurements can be obtained by using an MRI Model 3010 telephotometer. The linear polarizer 10 may be a circular sheet of NH22 polaroid. To facilitate alignment in the field, a sight piece 18 is extended radially outward from collar 14. By way of example, the sight piece 18 may comprise the locking screw of the polarizer holder which is conventionally used for securing collar 14 to the receiving end of the telescope 2. The polarizing axis of the polarizer material 10 is aligned with sighting piece 18, so as to initialized the measurement system.

The operation of the uniquely modified telephotometer for making polarization measurements is now described. The telephotometer 1 is first adjusted to eliminate any induced polarization artifacts. Incident light signals from the sun that are polarized in the atmosphere are supplied to linear polarizer 10. The light signals that are selectively transmitted through polarizer 10 are focused by objective lens 3 onto the detector 6 (i.e. PIN diode). The filter wheel 4 of the modified telephotometer is loaded with interference filters at 630 nm, 550 nm, 450 nm and 405 nm, plus a clear aperture for sighting purposes. As will be known to those skilled in the art, in a conventional telephotometer, a beam shifter (not shown) such as a rotatable glass plate, or the like, can be located in front of PIN diode 6 in order to shift the image reaching diode 6 when a target is used. However, when measuring visibility according to the preferred method, as described above, the beam shifter can be locked in a skyward position, inasmuch as the necessity of utilizing a target is avoided. Moreover, a deflecting mirror (also not shown) and an eyepiece 21, which are well-known means for sighting targets in conventional telephotometer applications are, in the modified telephotometer 1, used only to check alignment close to the horizon.

For purposes of convenience, the shadow from the sun can be used for suitable alignment purposes. That is, the shadow created by the sighting piece (e.g. locking screw) 18 on the light shield 16 provides a good indication of the telephotometer settings to receive both the parallel and perpendicular polarized components of the daylight at the maximum and minimum intensities thereof. The orientation of the telescope 2 may be determined by the well-known use of setting circles. By way of example, the field of view of diode 6 is 0.035°, so that the diode 6 is responsive to a circle of six meters in diameter at a distance of 1 km. Inasmuch as the position of the sun in the sky changes by approximately 15° every hour, a suitably automated drive system (not shown) may be incorporated within the modified telephotometer 1, so as to automatically adjust for this position change.

The modified telephotomer 1 is raised to a desired elevation (e.g. at 5° above the horizon) and aligned to make an angle of 90° to the plane containing the sun and the observation point. The linear polarizer 10 is initially set to transmit a first polarized component of the daylight, and the corresponding light intensities $I_1$ are successively measured by detector 6 for light signals being transmitted through each of the (four) filters that are loaded into filter wheel 4. The position of the polarizer 10 is next adjusted to transmit the second polarized component of the daylight, and the corresponding light intensities $I_2$ are successively measured by detector 6 at the different wavelengths provided by the filters in wheel 4. The masured intensities $I_1$ and $I_2$ are then correlated to provide the respective polarization ratios and, accordingly, a determination of visual quality and visual range.

As will be appreciated by those skilled in the art, the coupling of a telephotometer with a linear polarizer, as disclosed above, results in either of a modified telephotometer or in a type of nephelometer that is adapted to measure the angular and polarization properties of atmospheric light scattering. Such a modified telephotometer or nephelometer that is responsive to the polarization of the daylight sky for providing a measurement of visual quality or visual range is believed to be unique in the art of visibility measuring instrumentation.

The present method of determining visual quality and visual range in the atmosphere, by measuring the polarization properties of the daylight sky, can be suitably automated. By way of example, for visibility observations close to the horizon and at 90° to a vertical plane containing the sun (as shown in FIG. 2), the modified telephotometer 1 illustrated in FIG. 5 can be fitted with a conventional clock drive mechanism to maintain the desired alignment while tracking the sun across the sky (in a direction indicated by the arrow 24). The telescope collar 14 and the polarizer 10 are rotated (in a direction indicated by the arrows 26), to obtain successive measurements of the polarization ratio. The direction of maximum polarization varies with the position of the sun moving across the sky.

In operation, polarizer 10 is rotated once every five minutes, and the filter in wheel 4 is changed after each rotation. Two maximum and minimum polarization intensities ($I_1$ and $I_2$) are measured at wavelengths corresponding to each of the (four) filters in wheel 4, so that the polarization measurements are made in a total of twenty minutes.

Figure 6A:
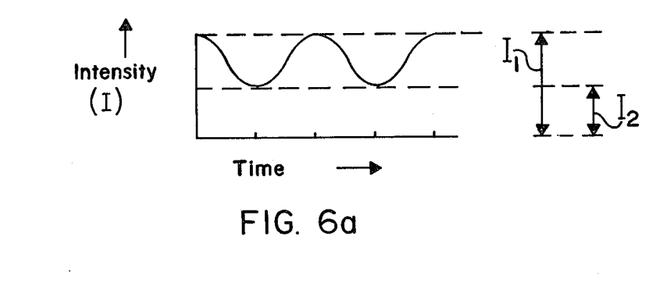
FIGS. 6a and 6b represent the respective waveforms of the output signals from the measuring apparatus of FIG. 5 tracking the rising sun in two different positions in the sky.
Figure 6B:
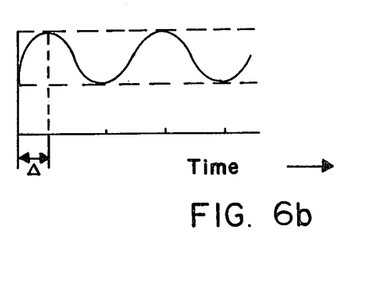

FIGS. 6a and 6b of the drawings represent the waveforms of two output signals from the automated telephotometer 1 as it tracks the rising sun at two different positions in the sky. The period of each waveform corresponds to the time for the polarizer 10 to be rotated 180°. Therefore, each output waveform respectively completes two cycles in the time required for one complete rotation of polarizer 10. The peak of each output waveform corresponds to the maximum polarized light intensity $I_1$, while the trough of each output waveform corresponds to the minimum polarized light intensity $I_2$. As the sun rises during the day, there will be a gradual phase shift in the output waveform of the telephotometer 1 with a changing of the position thereof during the course of the day. More particularly, the waveform shown in FIG. 6b is shifted in phase by an amount, designated $\Delta$, relative to the waveform shown in FIG. 6a, as the sun moves higher in the sky.

Figure 7:
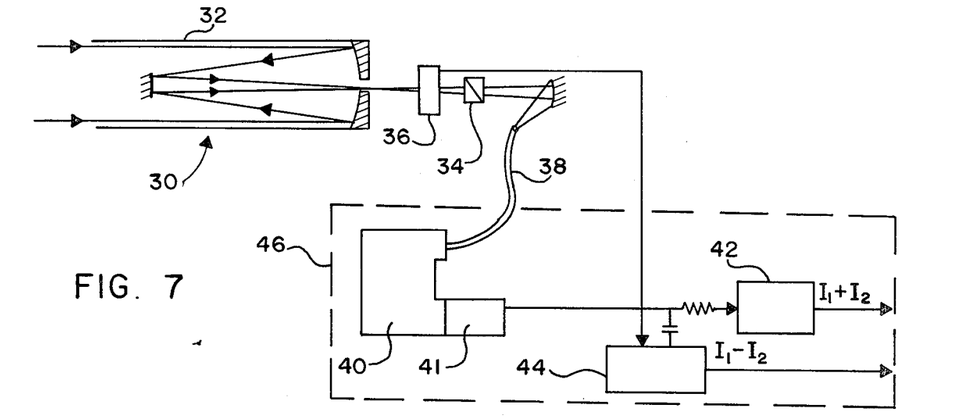
FIG. 7 is a schematic of an optical measuring system for measuring the polarization characteristics of the daylight sky utilizing polarization modulation techniques to obtain an indication of visibility.

Referring now to FIG. 7 of the drawings, a sensitive optical measuring system is illustrated which utilizes polarization modulation techniques for making remote polarization measurements of the daylight over the entire sky. The system includes an optical light collecting apparatus 30, comprising a conventional tubular telescope 32, and a linear polarizing element 34. In a preferred embodiment, the polarizer 34 is no longer rotated and is maintained at a fixed alignment in the direction of the polarized component of the daylight sky having an intensity $I_1$. Positioned between polarizer 34 and telescope 32 is a polarization modulation device 36. By way of particular example, the polarization modulation device 36 is a photoelastic modulator. The photoelastic modulator typically consists of a block of optically transparent material that is periodically stressed by a conventional transducer. The optical element of the photoelastic modular can be fabricated from quartz, calcium fluoride, zinc selenide, or the like materials, so that the electromagnetic spectrum in a range of from 185 mm to 16$\mu$ is available. A photoelastic modulator of this type is advantageous, because it is rugged, does not require excessively large electric or magnetic fields, has desirable transmission properties, and is characterized by large aperture and acceptance angles. In general terms, the photoelastic modulator employed herein functions as a polarization chopper and is adapted to provide a signal to indicate the degree of polarization of light supplied thereto. Such a photoelastic modulator is manufactured by Hinds International, Inc., Portland, Oreg.

Figure 8A:
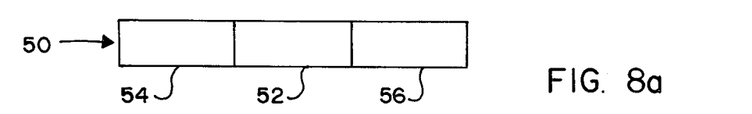
FIGS. 8a, 8b, and 8c show three different configurations of a photoelastic modulator for forming a polarization modulation device in the optical measuring system of FIG. 7.
Figure 8B:
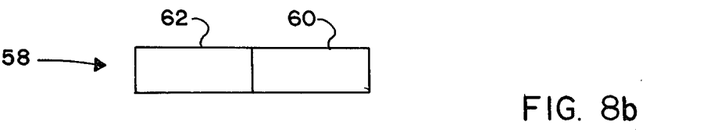
Figure 8C:
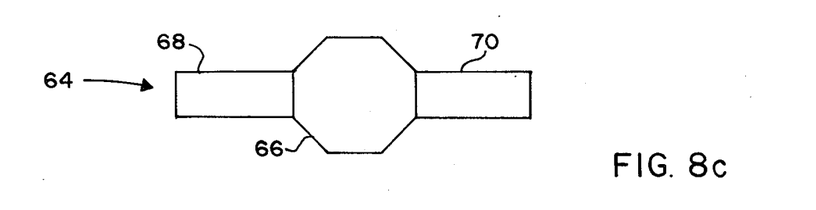

FIGS. 8a, 8b, and 8c of the drawings show configurations for three different photoelastic modulators that are suitable for application in the system of FIG. 7. In FIG. 8a, a first photoelastic modulator 50 comprises a rectangular optical element 52 that is stressed by a pair of transducers 54 and 56. Transducers 54 and 56 are located at opposite ends of optical element 52. In FIG. 8b, a second photoelastic modulator 58 comprises a rectangular optical element 60 that is stressed by a single transducer 62 located at one end thereof. In FIG. 8c, a third photoelastic modulator 64 comprises an octagonal optical element 66 that is stressed by a pair of transducers 68 and 70 located at opposite faces of the optical element 66. A photoelastic modulator having an octagonal optical element (i.e. 66) is particularly useful for obtaining polarization measurements in the infrared region of the spectrum, since an optical element having the octagonal geometry is not generally susceptible to fracture under the high mechanical stress that is typically required during infrared operation.

Figure 9A:
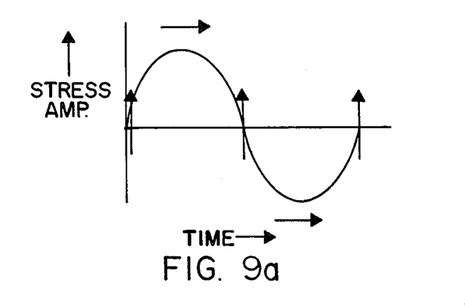
FIGS. 9a and 9b represent the respective waveforms of the modulators of FIGS. 8a–8c during half and quarter wave operations.
Figure 9B:
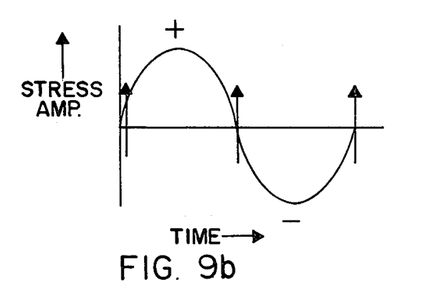

The photoelastic modulators 50, 58, and 64 of FIGS. 8a, 8b, and 8c are preferably resonant devices. That is, the respective transducers and optical element of the modulator vibrate at the same frequency, which advantageously reduces power input requirements and results in a measuring apparatus of greater stability. The amplitude of the stress being applied by the transducers to a corresponding optical element 52, 60, or 66 can be suitably adjusted, so that resulting strain induced birefringence in a respective optical element causes either of an oscillating half or quarter wave plate at a particular wavelength. For half wave operation, the modulation rate is twice the fundamental frequency of the modulator. For quarter wave operation, the modulation rate is at the fundamental frequency. When a non-rotating linear polarizer is positioned behind one of the photoelastic modulators 50, 58, or 64 (as is shown in FIG. 7) and at 45° to the stress axis thereof, the output signal therefrom is carried on an intensity modulated beam of fixed polarization. The wavelength dependence of the polarization can be analyzed by a diffraction gating. The depth of modulation of the output signal is proportional to the polarization of the incident light beam along the polarizer axes. The output waveforms from one of the modulators disclosed above during both half wave operation and quarter wave operation of the modulation device are illustrated in FIGS. 9a and 9b, respectively.

Referring once again to FIG. 7 of the drawings, incident light signals received by telescope 32 are transmitted through modulator 36 and polarizer 34. The combination of modulator 36 and polarizer 34 has the effect of a rotating polarizer (similar to that illustrated in FIG. 5), so that measurements of the intensities $I_1$ and $I_2$ of the perpendicularly aligned polarized light components can be obtained. Modulated light is then focused on an optical fiber 38, or similar transmission means. Optical fiber 38 acts as a flexible coupling to transmit the light signals from polarizer 34 to an analyzer comprising a monochromater 40 to provide wavelength discrimination of the measured intensities. Monochromater 40 is interfaced with a photomultiplier 41 and well-known detection electronics, so that an optical representation of polarization can be converted to electrical representations. A conventional dc amplifier 42 is connected to receive output electrical signals from photomultiplier 40. The magnitude of the output voltage signal from dc amplifier 42 provides an indication of the sum of the measured intensities $I_1+I_2$. The output signal of modulator 36 may also be used to supply a reference signal directly to a synchronous detector, such as a conventional lock-in amplifier 44. Lock-in amplifier 44 demodulates the output signal of modulator 36. The magnitude of the output (dc) voltage signal from lock-in amplifier 44 provides an indication of the difference of the measured intensities $I_1-I_2$. The voltage output signals from amplifiers 42 and 44 may be recorded (e.g. by a chart recorder), so that polarization ratios can be calculated at different wavelengths of light, whereby a measure of visibility can be determined as was previously disclosed. Moreover, monochromator 40, photomultiplier 41, and amplifiers 42 and 44 may be located in a safe environment 46, whereby to protect the sensitivity of the system shown in FIG. 7.

All gas phase air pollutants have characteristic light absorption properties in the ultraviolet and infrared regions of the electromagnetic spectrum. The general effect of the light absorption is to change the angular scattering dependence, decrease the overall scattering light intensity, and increase the polarization. Hence, measuring the polarization of the daylight sky in regions of molecular absorption may concurrently provide, by means of a single measurement, an indication of both aerosol size distributions and gas phase air pollutant concentrations. Aerosol size distribution can be examined by inverting the scattering data, so that the aerosol size distribution can be calculated from the measured light scattering properties of the aerosol in a range of wavelengths of the spectrum from 200 nm to 16μ. The system illustrated in FIG. 7 is suitable to obtain scattering data, in order that the aerosol size distribution can be determined directly from the light scattering properties of the atmosphere without resort to particle sizing and counting. However, a Fourier transform infrared spectrometer (FTIR) could replace monochromater 40 in the system of FIG. 7.

It will be apparent that while a preferred embodiment of the invention has been shown and described, various modifications and changes may be made without departing from the true spirit and scope of the invention. Having thus set forth preferred embodiments of the invention,

What is claimed is:

1. A method for determining visibility of the atmosphere comprising the steps of:
    measuring the intensities of two linearly polarized components of scattered daylight, said two components being respectively oriented perpendicular and parallel to a first plane containing the sun, an observation point, and a volume of the atmosphere under investigation,
    aligning a light intensity measuring means from said point of observation towards said volume at an observation angle of approximately 90° away from a vertical plane including the sun and said point of observation for measuring the intensities of said two linearly polarized components, and
    comparing said two intensities to one another, the greater the intensity of the polarized component of daylight perpendicular to said first plane relative to the intensity of the polarized component of daylight parallel to said first plane, the better the visibility of the atmosphere.

2. The method of determining visbility recited in claim 1, including the additional step of providing a measure of visual quality and visual range in the atmosphere by comparing said two intensities to one another and forming a polarization ratio (P) according to the relationship:

$$P = \frac{I_1 - I_2}{I_1 + I_2},$$

where $I_1$ is the measured intensity of said polarized component of daylight perpendicular to said plane, and $I_2$ is the measured intensity of said polarized component of daylight parallel to said plane,
    the larger the magnitude of the polarization ratio, the better the visual quality and the longer the visual range.

3. The method of determining visibility recited in claim 2, including the additional step of measuring the wavelength dependence of the polarization ratio over a particular range of the spectrum, the magnitude of the polarization ratio relative to the wavelengths of the light forming the two polarized components of the daylight providing an indication of the visual quality and visual range in the atmosphere.

4. The method of determining visibility recited in claim 2, including the additional step of distinguishing between conditions of gas phase absorption of light and the scattering of light in the atmosphere from particulate matter by comparing the measured intensities of said two polarized components with said polarization ratio during changing visibility situations,
    the changing of the intensities of said two measured components and a substantially unchanging polarization ratio indicating a condition of gas phase absorption, and
    the changing of the intensities of said two measured components and a correspondingly changing polarization ratio indicating a condition of particulate scattering.

5. The method of determining visibility recited in claim 1, including the additional step of supplying daylight having said two polarized components to a polarizing means, said polarizing means being selectively responsive to the respective perpendicular and parallel orientations of said components, so as to transmit said two components for measuring the respective intensities thereof.

6. The method of determining visibility recited in claim 5, including the additional steps of passing said two polarized components that are transmitted through said polarizing means through filter means being selectively responsive to a range of respective colors in the spectrum, and
    measuring the wavelength dependence of the intensities of said two polarized components over said spectral range.

7. The method of determining visibility recited in claim 5, including the additional step of rotating said polarizing means to successively measure the intensities of said two linearly polarized components as the sun changes its position in the sky.

8. The method of determining visibility recited in claim 5, including the additional steps of aligning a light-collecting means from said point of observation towards said volume,
    locating said polarizing means at the light-receiving end of said light-collecting means,
    rotating said polarizing means at the end of said collecting means for selectively transmitting therethrough each of said two linearly polarized components, and
    successively measuring the respective intensities of said two linearly polarized components as the sun changes its position in the sky.

9. The method for determining visibility recited in claim 8, including the additional steps of locating light filter means behind the polarizing means of said light-collecting means, said light filter means being responsive to respective wavelengths of light corresponding to a range of colors of the spectrum, transmitting said two linearly polarized components through said filtering means from said polarizing means, and measuring the wavelength dependence of the intensities of each of said two polarized components over said spectral range, the larger the measured difference between the intensities of said two polarized components at a particular wavelength, the better the visual quality and the longer the visual range.

10. The method for determining visibility recited in claim 8, including the additional steps of changing the position of said light-collecting means to maintain said angle of observation of approximately 90° as the position of the sun changes in the sky, and rotating said linear polarizing means, so that said polarizing means is oriented to selectively transmit said two linearly polarized components when the position of said collecting means is changed with a change in the position of the sun.

11. The method of determining visibility recited in claim 1, including the additional step of aligning a light intensity measuring means from said point of observation at an angle of elevation of approximately 5° above the horizon for measuring the intensities of said two polarized components.

12. The method of determining visibility recited in claim 1, including the additional step of measuring the degradation of visibility caused by a plume dispersing in the atmosphere by comparing the respective intensities of said two linearly polarized components of the light scattered by the plume with the respective intensities of said two linearly polarized components of the light scattered by the background sky of the plume.

13. The method of determining visibility recited in claim 12, including the additional step of providing a measure of the plume blight by forming a contrast ratio ($C_{PL}$) according to the relationship:

$$C_{PL} = \frac{I_{pt} - I_{st}}{I_{st}}.$$

where $I_{pt}$ is the sum of the two intensities of said polarized components scattered by the plume and $I_{st}$ is the sum of the two intensities of said polarized components scattered by the background sky, the magnitude and the polarity of the contrast ratio providing an indication of plume blight.

14. A method for measuring visibility at an arbitrary region of the atmosphere from the polarization properties of the daylight sky, said method comprising the steps of:

aiming a light-collecting means at the region of the atmosphere to be investigated, said collecting means receiving electromagnetic signals that are representative of two linearly polarized components of the daylight, said two components being respectively oriented perpendicular and parallel to a plane containing the sun, an observation point, and the arbitrary region being investigated, polarization-modulating said electromagnetic signals received by said light collecting means for converting said signals into an intensity modulated beam of fixed polarization, detecting the average intensity of said intensity modulated beam, detecting the amplitude of said intensity modulated beam at the frequency of modulation thereof, and comparing said detected average intensity with said detected amplitude, the magnitudes of said average intensity and said amplitude being indicative of the sum and difference, respectively, of the intensities of said two linearly polarized components of the daylight and, accordingly, a measure of visibility, the closer the magnitudes to none another of said average intensity and said amplitude, the better the visibility and the longer the range.

15. The method for measuring visibility recited in claim 14, including the additional steps of analyzing said intensity modulated beam, and measuring the wavelength dependence of said intensity modulated beam over a spectral range for providing an indication of visibility.

16. The method for measuring visibility recited in claim 14, including the additional steps of converting said intensity modulated beam into an electrical representation thereof, transmitting said electrical representation to a demodulating means for demodulating said representation and for providing a first output signal that is indicative of the amplitude of said intensity modulated beam, and transmitting said electrical representation to a d.c. amplifier for providing a second output signal that is indicative of the average intensity of said intensity modulated beam, the relative magnitudes of said first and second output signals providing a measure of visibility.

17. The method for measuring visibility recited in claim 14, including the additional steps of aiming said light-collecting means at a region in the atmosphere wherein molecular absorption occurs, and providing an indication of particulate size distribution and gas phase pollutant concentration within said region.

18. The method of measuring visibility recited in claim 14, including the additional step of aiming said light-collecting means from said point of observation towards said region of the atmosphere, so as to make an observation angle of approximately 90° away from a vertical plane including the sun and said point of observation.

19. The method for measuring visibility recited in claim 14, including the additional step of intensity modulating the electromagnetic signals by means of a photoelastic modulator comprising an optically transparent crystalline material.

20. The method of measuring visibility recited in claim 19, including the additional step of selecting a transmission range for said crystalline material to include wavelength coverage in the ultraviolet and infrared regions of electromagnetic spectrum.

21. The method for measuring visibility recited in claim 19, including the additonal steps of positioning a transducer means adjacent said crystalline material, and stressing said crystalline material so as to induce birefringence therein.

22. The method of measuring visibility recited in claim 21, including the additional steps of vibrating said transducer means and said crystalline material at the same frequency, and forming either of an oscillating half wave or quarter wave plate when said crystalline material is stressed.

* * * * *